United States Patent [19]

Radcliffe

[11] 3,898,569

[45] Aug. 5, 1975

[54] TRANSMISSION LINE CURRENT TRANSFORMER

[75] Inventor: Jerry K. Radcliffe, Owego, N.Y.

[73] Assignee: International Business Machines Corporation, Armonk, N.Y.

[22] Filed: May 24, 1974

[21] Appl. No.: 473,025

[52] U.S. Cl. .......................... 328/53; 328/65; 333/20

[51] Int. Cl.$^{2}$ .......................................... H03K 5/02

[58] Field of Search ............ 328/53, 56, 65; 333/20

[56] References Cited

OTHER PUBLICATIONS

Lewis, Some Transmission Line Devices For Use With Millimicrosecond Pulses, Electronic Engineering, Oct. 1955, p. 448–450.

*Primary Examiner*—Paul L. Gensler

*Attorney, Agent, or Firm*—Henry E. Otto, Jr.

[57] ABSTRACT

A fast rise-time current pulse is converted by a transformer-like action into a pulse of multiplied magnitude. This is achieved in two stages at respective junctions between a plurality of transmission lines.

At the first junction, a plurality n of low impedance transmission lines of equal characteristic impedance are connected with their inputs in series to provide a combined input impedance matching that of a feed line that drives this junction so there is no reflection for signals incident from the feed line. At the other junction, these *n* lines are connected in parallel to an output line of impedance $Z_0/n^2$. The action is similar to that of a transformer in that the current is increased almost n times, and voltage is reduced approximately by a factor of *n*.

3 Claims, 3 Drawing Figures

PATENTED AUG 5 1975 3,898,569

SHEET 2

TRANSMISSION LINE CURRENT TRANSFORMER

BACKGROUND OF THE INVENTION

This invention relates to apparatus for generating fast rise-time current pulses, and more particularly to such apparatus which by a transformer-like action is capable of converting a fast rise time current pulse into a fast rise time current pulse of multiplied magnitude.

In testing computer power distribution systems it is often necessary to generate large magnitude, fast-rise current pulses. High currents are difficult to obtain with conventional signal generators, and fast rise times are difficult to obtain with current multiplying transformers. There is a need for a relatively simple and efficient apparatus that can provide current multiplication of a fast-rising current pulse and/or a plurality of fast rising current pulses of equal or differing magnitudes to a plurality of outputs or loads.

SUMMARY OF THE INVENTION

The principal object of this invention is to provide an apparatus for generating fast rise-time large magnitude current pulses.

Another object is to provide an apparatus capable of generating fast rise-time current pulses of somewhat lesser magnitude in selectable combinations of output lines to drive selected loads.

Applicant has achieved these and other advantages by providing an apparatus comprising a plurality $n$ of low impedance transmission lines each with a characteristic impedance equal to $Z_0/n$, where $Z_0$ is the impedance of a feed line connected to the positive input terminal of the first of said $n$ lines and to the negative input terminal of the $n$th of said lines. The positive and negative input terminals of the $n$ lines are connected in series. Hence, when a current pulse of magnitude $I$ and voltage $V$ is injected into the $n$ lines from the feed line, the pulse is transformed into n currents of magnitude $I$ and voltage $V/n$.

According to one embodiment, the positive and negative output terminals of all $n$ lines are connected in parallel and then connected to a single two-wire output line having an impedance substantially equal to $Z_0/n^2$ to provide a current pulse in the output line of a magnitude approaching $nI$ while the voltage remains substantially at $V/n$.

According to an alternative embodiment, some of the $n$ lines have their respective positive and negative terminals connected in parallel to those of one output line, whereas the remainder of the $n$ lines may be arranged in other groupings for connection singly or in parallel with other output lines to drive a variety of loads. All current pulses will have a simultaneous fast rise time but differ in magnitude according to the number of $n$ lines connected to that particular output line.

According to a modification of the invention, each of the n lines is constituted by a preselected number $x$ of transmission lines of equal impedance connected in parallel. In such case, the groupings would consist of freely selectable ones of these $x$ lines and the current pulse in each output line will be of a magnitude approaching $I$ divided by $x$ and multiplied by that particular number of $x$ lines constituting the particular grouping.

Other objects and advantages of the invention will become apparent from the following more detailed description and from the accompanying drawings.

DESCRIPTION

Figure 1:
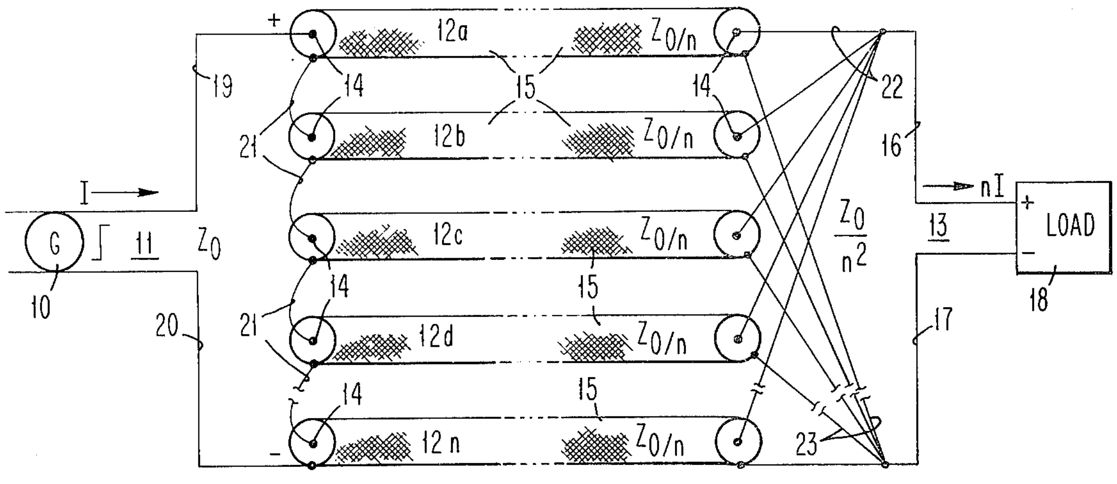
FIG. 1 is a schematic diagram of an apparatus constructed according to one embodiment of the invention.

The apparatus, as illustrated in FIG. 1, comprises a generator 10 for injecting a fast rise-time current pulse of magnitude $I$ and voltage $V$ into a feed line 11 of impedance $Z_0$. A plurality n of low impedance transmission lines 12*a*, 12*b*, 12*c*, 12*d* . . . 12*n* of substantially equal length are provided, each with a characteristic impedance substantially equal to $Z_0/n$ so that the sum of their impedances substantially matches that of the feed line. Feed line 11 and an output line 13, as well as each line 12, constitute "transmission lines," which term, as herein used, is intended generically to denote a two-wire line having a positive lead and a negative lead and of sufficient length that the time delay (i.e., wave propagation delay) is longer than the rise time of the current pulse; and, conversely, the term "two-wire line" is intended to embrace transmission lines. Each transmission line 12 may be in the form of a coaxial cable which, as illustrated, has a positive core 14 surrounded by a negative shield 15; the feed line 11 and output line 13 may be of coaxial cable but, for simplicity, are illustrated, as two-wire lines. The positive and negative leads 16, 17, respectively, of output line 13 are connected to a load 18 or other unit to which a fast-rising large magnitude current pulse is to be delivered.

According to a feature of the invention, positive lead 19 of feed line 11 is connected to the positive core 14 at the input terminal or end of the first transmission line 12*a* of the $n$ lines; and negative lead 20 is connected to the negative shield 15 at the input end of the last transmission line 12*n*. The input terminals or ends of the lines 12 are connected in series by wires 21; i.e., each wire 21 connects the negative shield 15 of one line 12 to the positive core 14 of the next succeeding line 12. However, as illustrated, the output ends or terminals of all lines 12 are connected in parallel; i.e., the positive core 14 of each line 12 is connected to the positive lead 16 of output line 13 by a wire 22, and the negative shield 15 of each line 12 is connected to the negative lead 17 of the output line by a wire 23.

In operation, assume that a pulse having a current of magnitude $I$ is injected by generator 10 into feed line 11 having the impedance $Z_0$. Since lines 12 have their inputs connected in series, this current will be transformed into $n$ currents of magnitude $I$ traveling on $n$ lines 12 of impedance $Z_0/n$. And, since lines 12 have their outputs connected in parallel, these currents will combine to produce a current approaching in magnitude $nI$ on output line 13 by an action similar to that of a transformer, in that the current is theoretically increased by a factor of $n$, and the voltage and impedance are respectively reduced by factors of $n$ and $n^2$.

It should be noted that since the impedance of each line 12$a$ . . . $n$ is equal and is of the magnitude $Z_0/n$, the sum of their impedances will match the $Z_0$ impedance of feed line 11; hence, there will be no reflection of signals incident from the feed line. Also, the length of lines 12$a$ . . . $n$ should be matched so that the individual currents I will arrive simultaneously at the junction of the lines 12 with output line 13.

It will be understood that, in practice, the theoretical value $nI$ of current multiplication will not be achieved, primarily because some of the available energy will be propagated in the stray fields existing between the lines 12$a$ . . . $n$ immediately following the injection of the pulse into the lines 12; this, of course, represents an energy loss in the system, and lines 12$a$ . . . $n$ should therefore be spaced apart and arranged to minimize this energy loss. Because of this energy loss, it is to be noted that the claims recite that the current magnitude is increased to a value approaching (rather than equal to) $nI$. Furthermore, because the output ends of all lines 12 are connected in parallel to output lines 13, the resultant short circuit causes the stray field current to be reflected back toward the feed line, with the result that the stray field energy loss will be reflected back and forth between the output line and feed line. For this reason, the current in the output line 13 will remain at the aforesaid magnitude approaching nI for a period substantially equal to, but certainly no longer than, twice the time delay of the respective lines 12; and because of degradation, a succeeding pulse should not be injected by generator 10 into feed line 11 until the reflected stray field energy loss dissipates.

Figure 2:
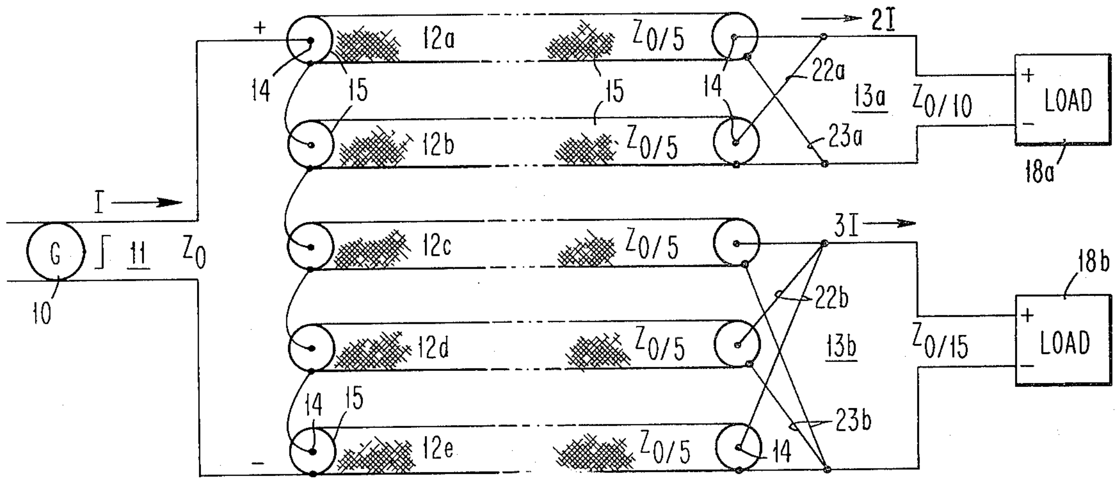
FIG. 2 is a schematic diagram of an apparatus constructed according to a slightly modified embodiment of the invention.

Thus, in the embodiment illustrated in FIG. 1, all of the transmission lines 12 are connected in parallel to a common output line 13 to produce a fast-rising current pulse of multiplied magnitude. If preferred, however, the apparatus may be modified in the manner illustrated in FIG. 2. In FIG. 2, similar reference numerals will be used to denote items substantially identical to those already described in connection with the embodiment of FIG. 1.

The apparatus as illustrated in FIG. 2 differs from that shown in FIG. 1 in only two respects. The FIG. 2 apparatus comprises five transmission lines 12$a$, $b$, $c$, $d$, $e$ and hence $n=5$ (see FIG. 1); and these five lines 12$a$ . . . $e$ are combined to pulse two output lines 13$a$, 13$b$ to drive loads 18$a$, 18$b$, respectively. More specifically, the outputs of lines 12$a$, $b$ (constituting only two of the five lines 12$a$ . . . $e$) are connected in parallel via wires 22$a$, 23$a$ to output line 13$a$, which has an impedance of $Z_0/10$ ($Z_0/n \cdot 2$), thereby providing to load 18$a$ a fast-rising current having a magnitude approaching $2I$. On the other hand, the outputs of remaining lines 12$c$, $d$, $e$ are connected in parallel via wires 22$b$, 23$b$ to output line 13$b$, which has an impedance of $Z_0/15$ ($Z_0/n \cdot 3$), thereby providing to load 18$b$ a fast-rising current having a magnitude approaching $3I$.

Thus, the lines 12 can be combined, as desired, to provide fast-rising current pulses of differing magnitudes (or, if preferred, of equal magnitudes in an apparatus having a number of lines 12 divisible into groups of equal number).

Figure 3:
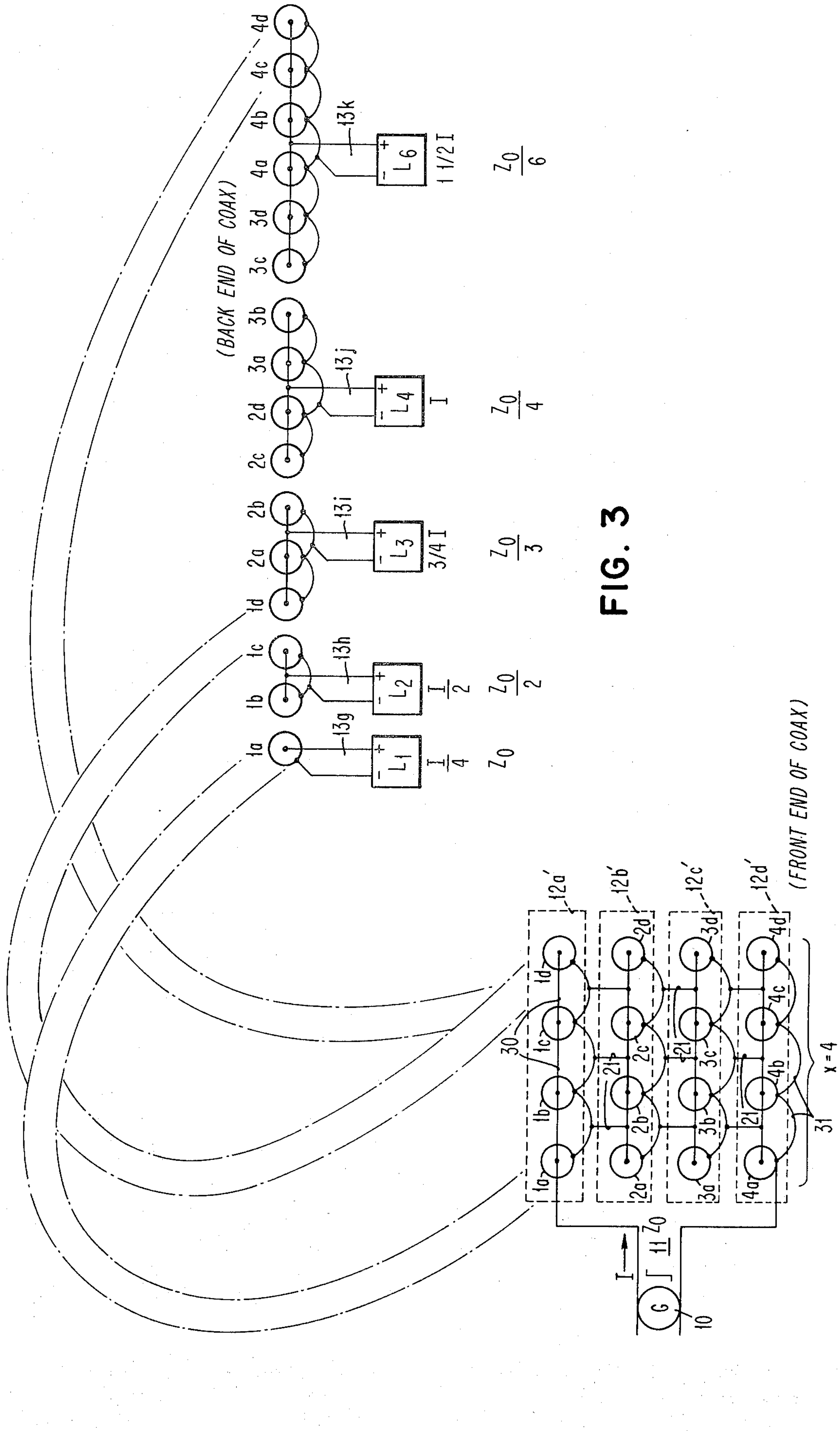
FIG. 3 is a schematic perspective view of an apparatus constructed according to a different embodiment of the invention, which enables the apparatus to be composed of transmission lines having the same impedance as the feed line.

The apparatus constructed according to the embodiment of FIG. 3 illustrates another capability of the invention. Assume that it is desired to construct the apparatus using coaxial cable (or other two-wire line) having one selected or available value of impedance $Z_0$. In such case, pieces of coaxial cable of identical length and impedance $Z_0$ are arranged schematically in a matrix; i.e., the lines 12$a'$, $b'$, $c'$ and $d'$ are now each constituted by a preselected number $x$ of coaxial cables. Thus, in the embodiment illustrated, $n=4$ (see FIG. 1); $x=4$; and there are a total of sixteen $x$ lines which are designated 1$a$, $b$, $c$, $d$; 2$a$, $b$, $c$, $d$; 3$a$, $b$, $c$, $d$; and 4$a$, $b$, $c$, $d$. All x lines forming part of a particular line 12 are connected in parallel by jumpers 30, 31; e.g., $x$ lines 1$a$, $b$, $c$, $d$ are connected in parallel to form line 12$a'$. In this manner, an impedance for each line 12$a'$, $b'$, $c'$, $d'$ of $Z_0/4$ is easily and automatically achieved, and a total impedance for these lines 12 of $Z_0$ will automatically substantially match that of feed line 11. The lines 12$a'$, $b'$, $c'$, $d'$ are connected in series by jumpers 21, as in the prior embodiments; however, as illustrated, these lines 12$a'$ . . . $d'$ are used to pulse output lines 13$g$, $h$, $i$, $j$, $k$ to drive different loads designated $L_1$, $L_2$, $L_3$, $L_4$ and $L_6$.

This subscript designation indicates the number of $x$ lines having their output terminals connected in parallel. Thus, where the output of $x$ line 1$a$ is connected directly via output line 13$g$ to load $L_1$, there is actually no parallel connection; and the fast-rising current pulse delivered to $L_1$ actually has a magnitude less than $I$ and approaching $I/4$. Where the outputs of four x lines (e.g., 2$c$, 2$d$, 3$a$, 3$b$) are connected in parallel to output line 13$j$, the fast-rising current pulse delivered to load $L_4$ will have a magnitude approaching I. Current multiplication is achieved when the number of $x$ lines having their outputs connected in parallel exceeds the number of $n$ lines 12; i.e., in the embodiment illustrated, when there are more than four lines $x$ having their outputs tied in parallel. Thus the six $x$ lines 3$c$, $d$, 4$a$, $b$, $c$, $d$ with outputs connected in parallel to line 13$k$ will provide a fast-rising current pulse having a magnitude approaching $1\frac{1}{2} I$.

Since a square matrix configuration of lines $x$ is illustrated, the impedances of the respective output lines 13$g$, $h$, $i$, $j$, $k$ are $Z_0$, $Z_0/2$, $Z_0/3$, $Z_0/4$ and $Z_0/6$. It will thus be seen that in the embodiment of FIG. 3, the impedance of each output line should be $Z_0$ divided by that number of the preselected $x$ lines connected in parallel to that particular output line. And the output current pulse to each output line will have a magnitude approaching that of I divided by the preselected number $x$ and multiplied by that number of the preselected $x$ lines that are connected in parallel to that particular output line. Thus, the output currents in lines 13$g$, $h$, $i$, $j$, $k$ will approach $I/4$, $I/2$, $\frac{3}{4} I$, $I$ and $1\frac{1}{2} I$, respectively.

Connections of the type illustrated are desirable where a high magnitude current pulse is to be divided and distributed to a number of loads simultaneously. Obviously, if a current pulse of magnitude approaching $4I$ were desired, the outputs of all sixteen $x$ lines would be connected in parallel to a single output line driving a single load.

The lines 12 (including any $x$ lines connected in parallel to constitute same) should be of substantially equal length; i.e., any disparities in length should be small enough so that the difference in arrival time at the output end of the longest and shortest line 12 (or $x$) will not exceed about ten percent (10%) of the rise time of the current pulse.

An important feature of the invention is that any number of these $x$ lines may be randomly connected in parallel to a selected output line for a particular load;

i.e., outputs of any six $x$ lines (e.g., 1$a$, 1$d$, 2$c$, 3$b$, 3$d$, 4$c$) may be connected in parallel and achieve the same result.

This is because, as above noted, the current in output lines 13$g$ . . . $k$ cannot be kept up for a time interval longer than twice the time delay of the lines 12$a'$, $b'$, $c'$, $d'$, each of which has an impedance of $Z_0/n$. Thus, the fact that the choice of particular $x$ lines selected for combination in parallel would affect degradation of the current pulse after said time interval becomes irrelevant, as no practical problem is posed during the aforesaid time interval.

In lieu of the square matrix illustrated in FIG. 3, it may be desirable, for example to match various impedance levels, to construct a matrix comprising a preselected number $x$ of parallel connected transmission lines constituting each n line and a number of $n$ lines different than $x$. With the resultant $x$ by n matrix, when the output terminals of the various $x$ lines are connected in groups, the output impedance of each group will be $Z_0$ multiplied by $x$ and divided by n times the number of $x$ lines in that particular group. Thus, if there were four $n$ lines each constituted by two parallel connected $x$ lines, and any five of these eight $x$ lines were connected in parallel to a particular output line, the impedance of that particular output line will be $$\frac{Z_0 \cdot x}{n \cdot x_g} = \frac{Z_0 \cdot 2}{4 \cdot 5} = \frac{Z_0}{10},$$

where $x_g$ represents that number of $x$ lines connected in parallel to form the particular group.

In actual practice, a 6 × 6 schematic matrix of transmission lines (similar to the 4 × 4 matrix of FIG. 3) was constructed using 36 coaxial cables, each having an impedance of 50 ohms to match that of a generator and 50-ohm feed line. The six $x$ lines were tied in parallel to constitute each of six $n$ lines, and reduce the impedance of each $n$ line to 8.33 ohms, since a transmission line of this characteristic impedance was not readily available. When a current of magnitude $I$ was injected into the feed line, it was found by actual measurement that the current was increased by a factor of five rather than the theoretical six; i.e., the fast-rising current pulse had a magnitude of approximately $5I$ (instead of $6I$).

While the invention has been particularly shown and described with reference to preferred embodiments thereof, it will be understood by those skilled in the art that the foregoing and other changes in form and details may be made therein without departing from the spirit and scope of the invention. Accordingly, the current transforming apparatus are considered merely as illustrative, and the scope of the invention is to be limited only as specified in the claims.

What is claimed is:

1. Apparatus for providing fast rise-time current pulses, comprising a plurality n of low impedance transmission lines of substantially equal length each with a characteristic impedance substantially equal to $Z_0/n$, and each having positive and negative input terminals and output terminals, means connecting the positive and negative input terminals of said lines in a string, the positive terminal of each line, except the first, being connected to the negative terminal of the preceding line in the string, means, including a two-wire feed line having an impedance substantially equal to $Z_0$, connected to the positive input terminal of the first of said $n$ lines and to the negative input terminal of the nof said lines, for injecting a current pulse of magnitude $I$ and voltage $V$ into said lines to transform said current pulse into $n$ currents of magnitude $I$ and voltage $V/n$, means connecting the positive and negative output terminals of at least some of said $n$ lines in parallel to form subset groupings consisting of desired numbers of $n$ lines, and means including a plurality of two-wire output lines, each of said output lines being connected in parallel to the positive and negative output terminals, respectively, of a respective one of said groupings simultaneously to provide a fast rise-time current pulse in each respective output line of a magnitude approaching $I$ times the number of $n$ lines in the corresponding grouping, each specific output line having an impedance substantially equal to $Z_0$ divided by $n$ times the number of $n$ lines in the subset grouping connected to that specific output line.

2. Apparatus according to claim 1, wherein a preselected number $x$ of transmission lines of equal impedance are connected in parallel to constitute each n line, and said groupings consist of selected ones of said $x$ lines, such that the current pulse in each output line will be of a magnitude approaching $I$ divided by $x$ and multiplied by the number of parallel connected $x$ lines constituting a particular corresponding grouping.

3. Apparatus according to claim 2, wherein said groupings may be formed from any of the $x$ lines even those associated with and constituting different ones of the $n$ lines.

* * * * *